Sept. 16, 1930.  A. K. SMITH  1,775,918
PIMIENTO CORING MACHINE
Filed Aug. 26, 1927  6 Sheets-Sheet 1

Fig. 1.

INVENTOR.
Albert K. Smith
BY
ATTORNEY

Sept. 16, 1930.                A. K. SMITH                1,775,918
                         PIMIENTO CORING MACHINE
                    Filed Aug. 26, 1927         6 Sheets-Sheet 5

INVENTOR.
Albert K. Smith
BY Victor D. Borst
ATTORNEY

Patented Sept. 16, 1930

1,775,918

UNITED STATES PATENT OFFICE

ALBERT K. SMITH, OF WEST ORANGE, NEW JERSEY, ASSIGNOR TO THE HILLS BROTHERS COMPANY, INC., A CORPORATION OF NEW YORK

PIMIENTO-CORING MACHINE

Application filed August 26, 1927. Serial No. 215,548.

This invention relates to a fruit coring machine particularly adapted to remove the core from a pimiento or pepper or the like. It is the common practice to remove the core from a pimiento by cutting the same free from the sides of the fruit with the aid of a tubular knife which an operator manipulates with one hand while holding the fruit in the other hand. Such a procedure is obviously very slow and costly particularly when quantity production is desired.

It is the purpose of this invention to provide a machine automatic in nature and which may be continuous in operation which will remove the cores from pimientos, peppers or similar fruit and which requires only a single operation of an operator to place the fruit in the machine, the machine thereafter automatically functioning to completely remove the core and discharge the cored fruit and cores into suitable receptacles.

In accordance with this invention I provide a coring head comprising a coring knife and clamping members for supporting a pimiento in cutting relationship to the knife. The knife and supporting means are removable relatively to each other within the head and the knife also independently of the supporting member in a manner to cause the knife to enter the fruit and cut the core free from the sides of the fruit. Means are provided for operatively actuating the coring head to cause the clamping members to alternately grip and release a pimiento and to cause the knife to enter the fruit and cut the core therefrom while the pimiento is firmly held by the grippers.

A series of such heads may be mounted upon an endless conveyor and actuated by suitable cams to cause the heads to successively function in rotation as the conveyor carries the heads by a certain point. Such a machine is continuous and automatic in its operation and requires only a single operator to place the pimientos upon the heads at a given point in their travel around the conveyor, the cored fruit and cores being discharged when the head releases them. For purposes of illustration I have shown such an embodiment of my invention in the accompanying drawings which will hereinafter be described in detail, and in which:

Referring to the drawings the machine illustrated therein is carried by a rectangular frame 1 which carries at each end thereof a pair of spaced bearings 2 and $2^a$ adjustably mounted upon the frame for movement parallel to the length thereof and held in adjusted position by means of cap screws 3 or some other suitable means. These bearings rotatably support shafts 4 and $4^a$ extending across each end of the machine and to each of which are rigidly secured a pair of spaced sprocket wheels 6 and $6^a$. A chain 7 is passed over one sprocket at each end and joined at the ends to form a continuous conveyor comprising the two spaced parallel chains between which are secured a plurality of coring heads. The upper stretch of each chain between sprockets 6 and $6^a$ travels between guide rails 8 and $8^a$ carried by the frame 1 (Figs. 1 and 2) whereas the lower stretch of each chain is guided and supported by a U-shaped guide rail 9 also supported from the frame.

Each coring head is similar in construction (Figs. 6, 7, 8, 9 and 10) and comprises an upper body member 10 consisting of an annular ring 11 having formed integrally therewith and extending vertically therefrom four spaced arms 12 which terminate in a lower annular ring 13 which is secured to a lower cylindrical member 14 in any suitable manner such as by cap screws 15. The head members 10 and 14 are preferably cast from some relatively light weight metal or alloy to maintain the total weight of the moving parts of the machine to a minimum. The upper ring 11 is bored centrally and machined to provide a bearing for a rotary friction disk knife support 16 which is rotatably mounted within the ring 11 and secured therein by means of a retaining ring 17. A tubular knife 18 of proper diameter to completely surround a pimiento core is mounted centrally within the disk 16 to rotate therewith. Disk 16 may be covered with an antifriction covering 19 to give a better driving contact if so desired.

In order to support a pimiento over the knife and then move it down upon the knife, two sets of gripper members are provided, one pair disposed within the knife for gripping the stem and insuring that it is centrally disposed in relation to the knife, and one pair surrounding the knife for grasping the pimiento exteriorly to positively insure the coring action.

Accordingly a pair of tong like grippers 20 extending upwardly and centrally within the knife are pivotally mounted upon pivots 21 in a bifurcated block 22 supported within the arms 12 upon the end of a hollow rod 23 extending upwardly through the bottom of member 14 and mounted for rotation and vertical reciprocation therein. Rod 23 has a groove 23ª cut thereinto which extends vertically along the shaft for a short distance and at its upper extremity takes a quarter turn spirally around the rod. A pin 23ᵇ is threaded into the bottom wall of member 14 and extends into the central bore therethrough a sufficient distance to engage in slot 23ª to cause the rod 23 to be rotated ¼ revolution during its reciprocating movements. To the lower end of rod 23 is rotatably secured a bracket 24 by means of a split securing washer 25 which fits within an annular groove cut in the rod 23 adjacent the end thereof and which washer is secured to the bracket 24 by means of screws or the like. The bracket 24 also carries a cam roller 26 which projects slightly below the rear face thereof, which roller is adapted to contact with a cam track, later to be described, for reciprocating the rod 23. A guide rod 27 projects upwardly from the bracket 24 and through a hole bored in the lower wall of member 14 to prevent the bracket from rotating during its reciprocation with rod 23. To normally bias the rod 23 in its downmost position a coiled compression spring 28 is placed around the rod 23 between the bracket 24 and the rear face of member 14.

The grippers 20 are moved about their pivots 21 by a pair of toggle links 29 pivotally connected to the grippers by pins 30, one pair of such links being upon each side of the grippers and pivotally connected to each other by pin 31, pin 31 also having a spacing and abutment sleeve 33 thereon between the pairs of links to maintain them in spaced position on the pin. Tension springs 32 are attached to pins 30 upon each side of grippers 20 to constantly urge the grippers toward each other. A rod 34 extends upwardly through the center of rod 23 and is adapted to contact with block 33 to move links 29 upwardly to separate grippers 20 against the normal action of springs 32. Rod 34 is limited in its downward movement by pin 35 and carries a clevis 36 upon its lower end in which is mounted a cam roller 37 adapted to contact with a cam rail or track, later to be described, for actuating the grippers at the proper times.

A second pair of gripper members is provided for supporting the body of the fruit by grasping it exteriorly comprising a pair of concaved members 40 disposed upon diametrically opposite sides of the tubular knife 18 curved to approximately the average diameter of a pimiento and having cylindrical bosses 41 projecting laterally therefrom. Grippers 40 are resiliently mounted upon the ends of short rods 42 by means of a compression spring 43 (Fig. 9) set into the boss 41 which is bored to receive the spring 43 and the end of rod 42, movement of the grippers thereon being limited by a pin 44 driven through rods 42 and projecting through slots 45 in the bosses 41. Rods 42 are adjustably secured in the upper ends of two arms 46 pivotally mounted upon two diametrically opposite arms 12 which are constructed larger and are bifurcated for the purpose. The arms 46 are slotted as at 47 from substantially the mid point to a point adjacent their lower ends to permit of vertical sliding movement as well as pivotal movement about pivots 48. A spring 50 is attached to the lower ends of arms 46 and to the member 14 to constantly urge the arms 46 downwardly and consequently the grippers 40 inwardly. As an additional aid in closing the grippers the arms 46 are formed at their upper extremities with laterally projecting fingers 51 and a tension spring 52 is connected therebetween under tension to bring the two clamping members together.

The arms 46 are also formed with fingers 53 extending inwardly from the lower ends thereof adapted to be engaged, as the block is reciprocated vertically and rotated with rod 20, by bifurcated wings 54 projecting from opposite sides of the upper end of block 22. A stop pin 55 is set into the arms 12 to limit the downward movement of arms 46 by contact with fingers 53.

Member 14 is bored horizontally at two spaced points upon each side thereof adjacent its lower face as at 56 to receive pins 57 of the conveyor chain 7 and which pins may be locked therein by set screws 58, two alternate pins 57 being extended beyond the chain for that purpose.

To actuate the heads as they are carried around with the conveyor, a pair of cam tracks 60 and 61 are adjustably secured to the frame below and above the upper and lower straight stretches of the conveyor respectively and are so spaced therefrom that roller 26 contacting with track 60 will hold rod 23 in its uppermost position. Track 60 is so disposed as to contact with roller 26 during the major portion of the travel of the coring head along the upper and lower stretches. The upper and lower sections, however, converge toward each other and terminate at the left end of the machine to allow rod 23 to descend, to close grippers 40 to grip the pimiento exteriorly and in conjunction with grippers 20 bring the pimiento down upon the knife. At the right end of the machine, track 60 is made continuous by extending the ends tangentially to a disk 62 fast upon shaft 4.

Track 61 contacts with roller 37 and is positioned slightly below track 60 along the upper stretch and slightly above track 60 along the lower stretch thereof. This track by its contact with roller 37 reciprocates rod 34 within rod 23 to actuate grippers 20 and therefore stops short of track 60 at the left and along the upper stretch to allow the grippers to close before the rod 20 descends, and starts later on the lower stretch to open grippers 20 after track 60 has caused grippers 40 to open. Track 61 is notched along the right end of the lower section to cause grippers 20 to be vibrated after being opened to shake any stems free that may be hanging to the grippers.

Figure 3:
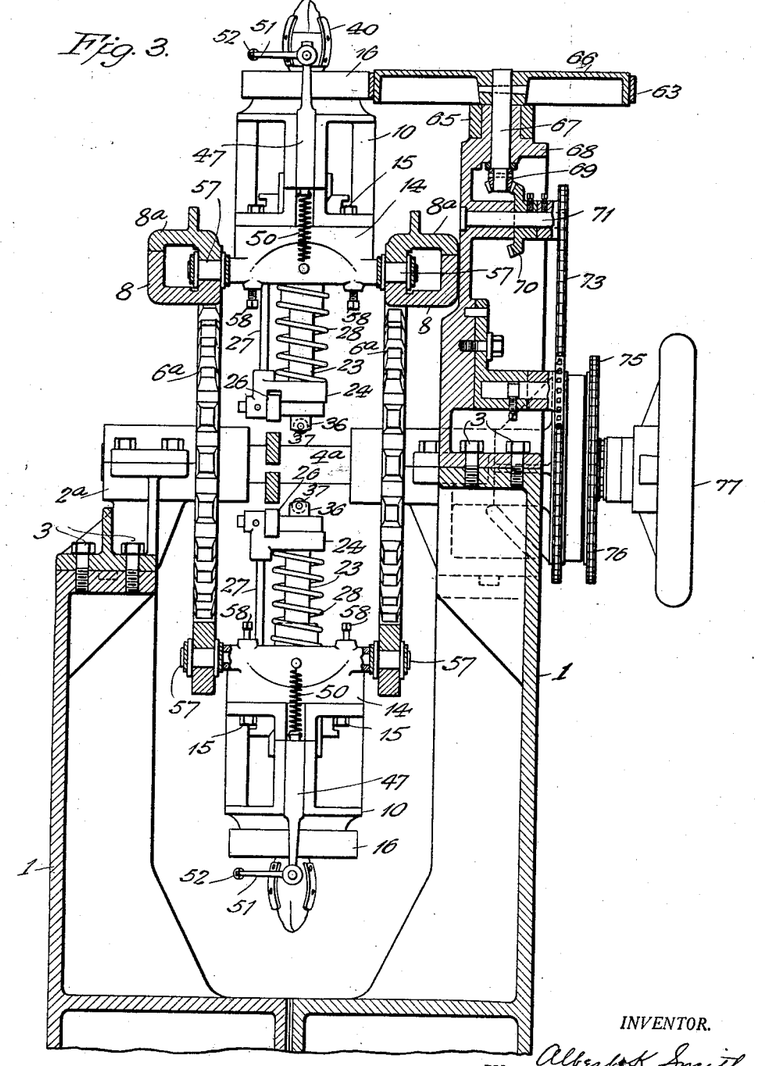
Fig. 3 is a similar section on line 3—3 of Fig. 1.
Figure 4:
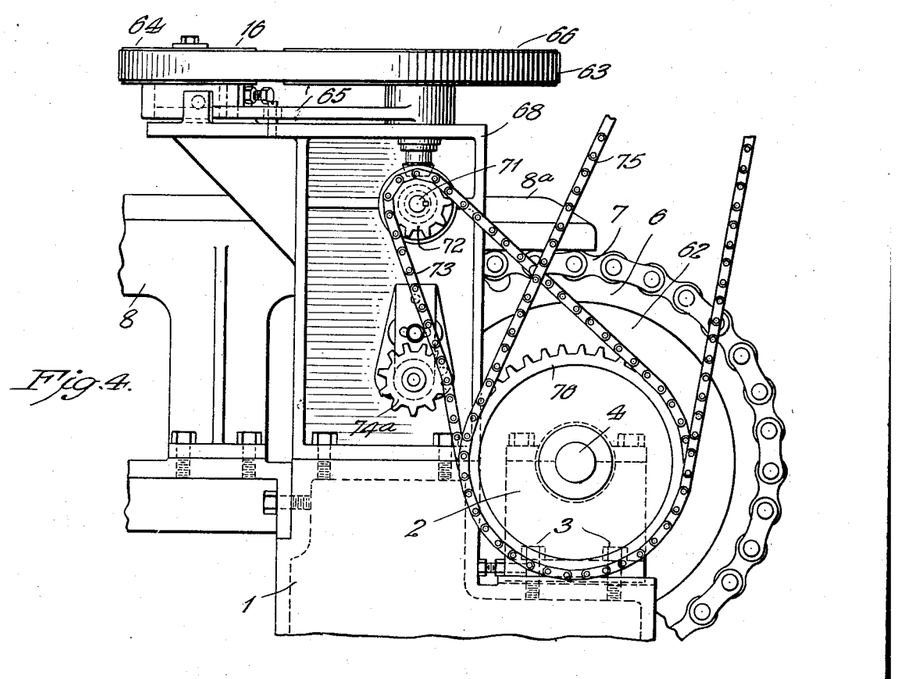
Fig. 4 is an elevation of the driving mechanism and the knife drive.
Figure 5:
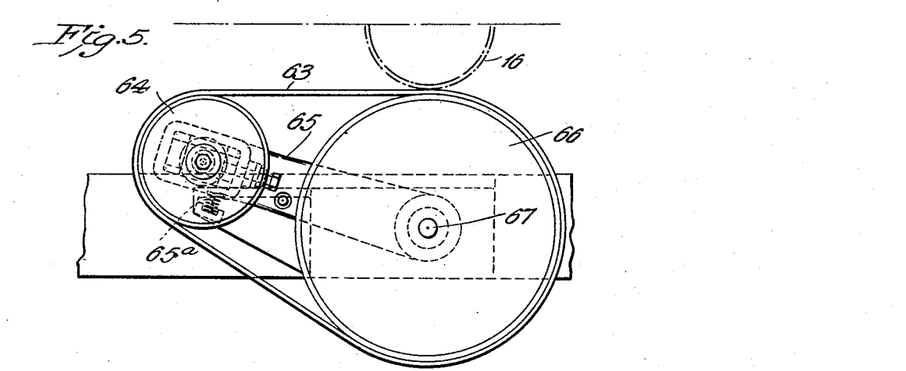
Fig. 5 is a plan of the knife drive.
Figure 6:
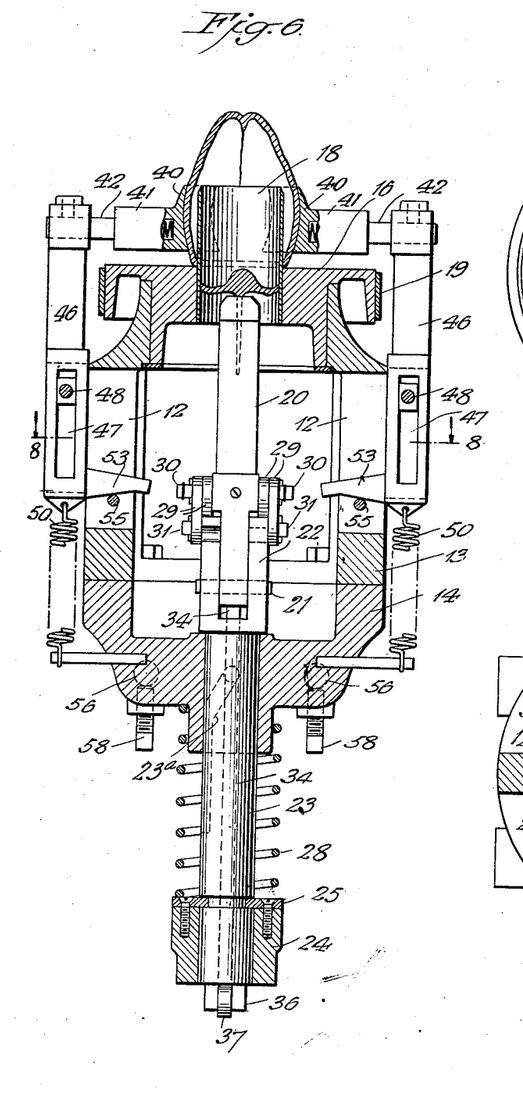
Fig. 6 is a section through one of the coring heads at the completion of the coring operation but with the pimiento still held by the grippers.
Figure 7:
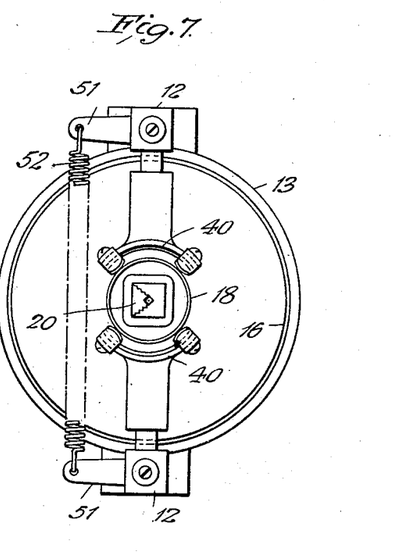
Fig. 7 is a plan view of one of the heads.
Figure 8:
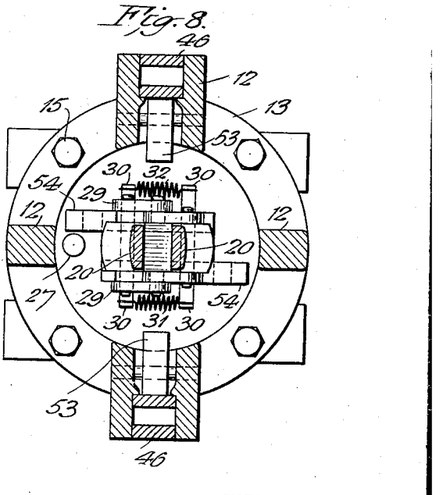
Fig. 8 is a section on line 8—8 of Fig. 6.

Tubular knives 18 and friction disks 16 are rotated as the clamping members descend to move the pimiento in contact therewith by engagement of disk 16 with a friction belt 63 which travels around two spaced pulleys 64 and 66. Pulley 64 is merely an idler adjustably mounted toward and from pulley 66 in the outer end of an arm 65 pivoted about the center of pulley 66 as a fulcrum and spring pressed inwardly toward the conveyor by a spring 65$^a$ whereby the inner stretch of the friction belt may be adjusted toward or from the line of motion of the coring heads. Pulley 66 is the driving pulley and is rigidly secured to the upper end of spindle shaft 67 rotatably supported in the end of a bracket 68 secured to the end of the machine frame. The lower end of shaft 67 carries a bevel gear 69 which meshes with another bevel gear 70 (Fig. 3) secured to a stub shaft 71 also mounted in bracket 68. Shaft 71 has a sprocket 72 upon its outer end over which a chain 73 travels to drive sprocket 72 from a sprocket 74 fast upon shaft 4, the tension of chain 73 being adjustable by means of an adjustable idle sprocket 74$^a$ in the usual manner. Shaft 4, and thereby the entire machine, is driven by a chain 75 traveling over a sprocket 76 mounted upon the outer end of shaft 4 and which may be clutched thereto by a friction clutch controlled by hand wheel 77, the chain being driven from any suitable source of power.

Figure 1:
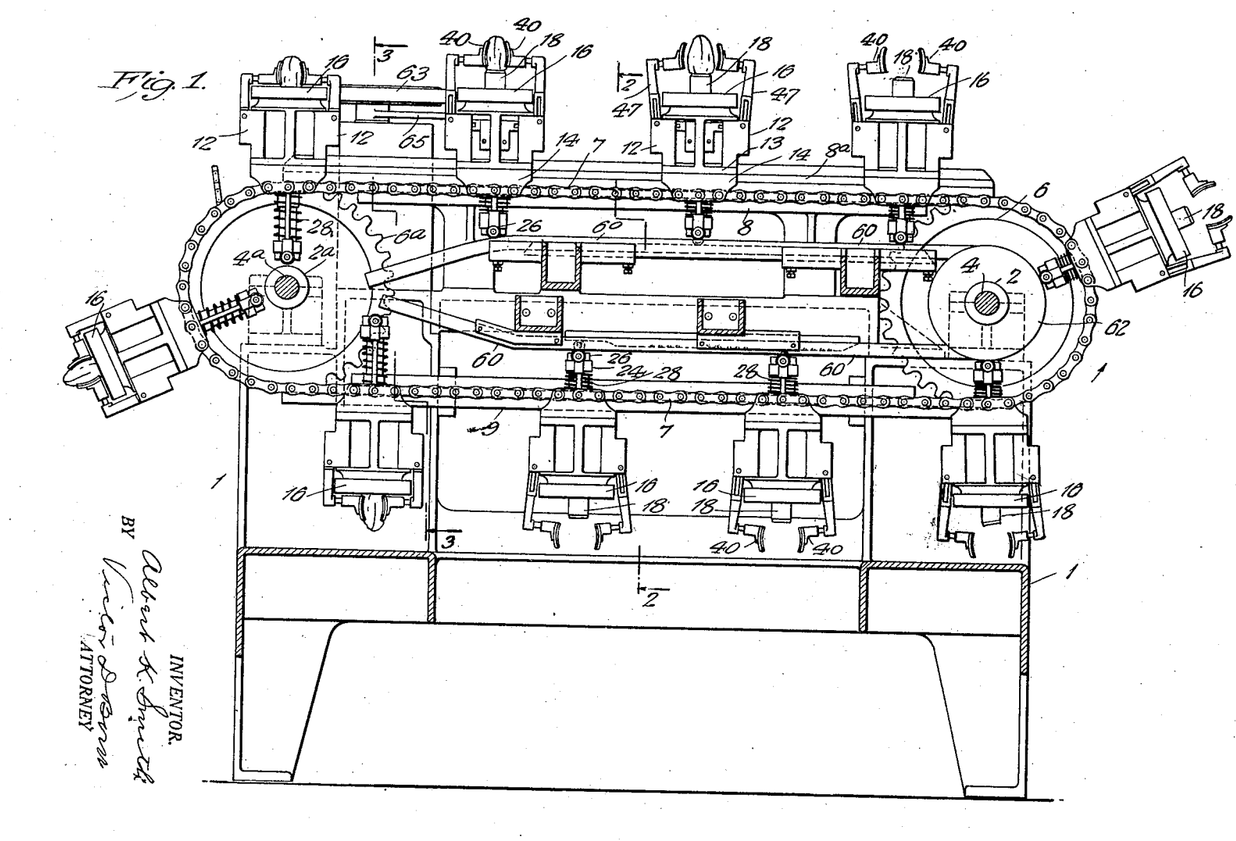
Fig. 1 is a longitudinal vertical section through a machine illustrating one embodiment of my invention.
Figure 2:
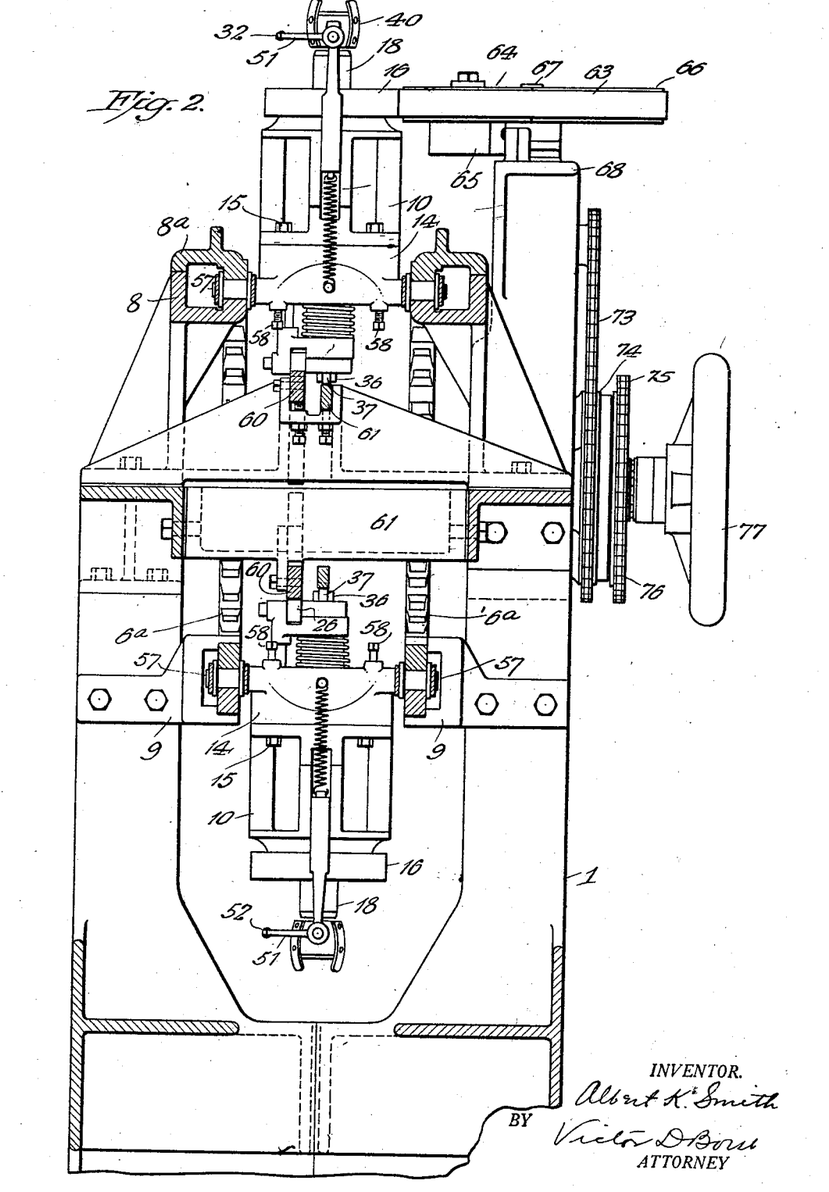
Fig. 2 is a transverse section on line 2—2 of Fig. 1.
Figure 9:
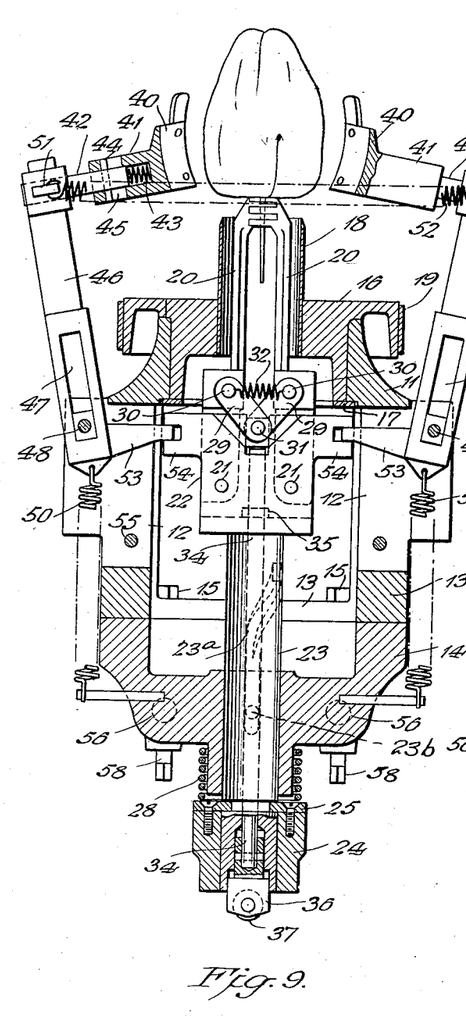
Fig. 9 is a front sectional detail through one of the coring heads illustrating the gripping and centering action upon the stem of the pimiento.
Figure 10:
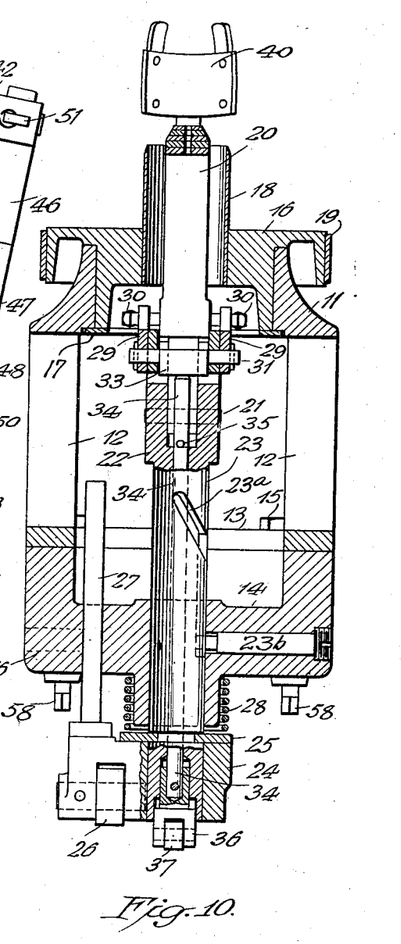
Fig. 10 is a side sectional detail of a head alone in position illustrated in Fig. 9.

The operation of the machine is as follows: Viewing the machine as shown in Fig. 1, the operator will stand adjacent the right end of the machine and place the pimientos to be cored in the heads as they are carried around by the conveyor in an anti-clockwise direction by placing the pimientos with the stem down between the grippers 40 and with the stem between the grippers 20, both grippers being open at this position. As the coring heads are moved toward the left, rollers 26 and 37 will travel along tracks 60 and 61 respectively, and as roller 37 reaches the end of its track 61 it will drop and allow the rod 34 to descend, which in turn will permit the grippers 20 to close upon the stem of a pimiento (Figs. 2 and 9). As the coring head moves a little farther to the left, roller 26, contacting with track 60, will descend due to the downward inclination of track 60 at the left end of the machine. This will cause grippers 40 to close upon the exterior of the pimiento and cause grippers 20 and 40 to descend under the force of spring 28 carrying the pimiento downwardly with respect to knife 18 to cut the core free from the sides of the pimiento. Rod 23 and grippers 20 will be given one quarter turn with respect to the rest of the head due to groove 23$^a$ and pin 23$^b$ to entirely free the core from the fruit. Simultaneously with the downward movement of the grippers, knife 18 is rotated since its associated friction disk has reached friction belt 63 and is rotated thereby, belt 63 being driven so that its surface contacting with the disk 16 travels toward the right. The heads will then travel around sprocket 6$^a$ and along the lower stretch of the conveyor where cam roller 26 will again contact with track 60, travel down the inclined end thereof, thereby opening clamping members 40 and simultaneously moving them away from the knife, thereby discharging the cored pimiento into a suitable receptacle (not shown) which may be placed under the machine. As the coring head then travels a little further, roller 37 will contact with the lower section of track 61 which takes a drop at this point which will open the jaws 20 to release the stem and core attached thereto. The right end of the lower section of track 61 being notched, grippers 20 will be vibrated or shaken as the coring head travels over this last section of the track and consequently any stems which may be sticking to the grippers 20 due to their irregularity and shape, will be shaken free and the stems and their associate cores deposited in another receptacle (not shown) which may be placed under the machine. From here the coring heads will travel around sprocket 6 and be ready to have other pimientos placed thereon by the operator.

It is obvious that various changes may be made in the details of the structure, that any number of heads may be employed, and other changes made without departing from the spirit and scope of the invention as defined in the appended claims.

I claim:

1. In a fruit coring machine, movable clamping members for gripping and supporting the fruit, a coring knife, means for moving said support and said knife relatively to each other to cause the knife to cut the core free from the sides thereof, and means for extracting the cut core from the fruit.

2. In a fruit coring machine, a clamp for supporting the body of the fruit, a member for gripping the stem of the fruit, a coring knife, and means for moving said support and said knife relatively to each other to cause the knife to cut the core of the fruit free from the sides thereof.

3. In a fruit coring machine, a clamp for supporting the body of the fruit, a member for gripping the stem of the fruit, a coring knife and means for moving said support and said knife relatively to each other to cause the knife to cut the core of the fruit free from the sides thereof, and means for actuating said member to withdraw the cut core from the fruit.

4. In a fruit coring machine, a clamp for supporting the body of the fruit, a member for gripping the stem of the fruit, a coring knife, means for moving said support and said knife relatively to each other to cause the knife to cut the core of the fruit free from the sides thereof, and means for rotating said member to extract the cut core from the fruit.

5. In a fruit coring machine, pivoted clamping jaws for supporting the body of the fruit, a tubular coring knife, power driven means for giving the knife and jaws a relative movement in two directions to cause the knife to enter the fruit and to withdraw it therefrom, and means for producing a relative rotational movement of the supported fruit and the knife only while the knife is entering the fruit.

6. In a fruit coring machine, pivoted clamping jaws for supporting the body of of the fruit, a tubular coring knife, means for rotating said knife and simultaneously moving said support and knife relatively to each other to cause the knife to cut the core free from the sides of the fruit, and means for extracting the cut core from the fruit.

7. In a pimiento coring machine, a tubular coring knife, a gripper member for gripping the stem of the pimiento and centering it with respect to said knife and means for moving said member and said knife relatively to each other to cause the knife to cut the core free from the sides of the fruit.

8. In a pimiento coring machine, a tubular coring knife, a gripper member for gripping the stem of the pimiento and centering it with respect to said knife, means for moving said member and said knife relatively to each other to cause the knife to cut the core free from the sides of the fruit, and means for imparting further movement to said member for extracting the cut core from the fruit.

9. In a pimiento coring machine, a coring head having a coring knife mounted therein, a pair of clamping members for gripping the exterior of the pimiento and supporting it over said knife, and a pair of gripper members for gripping the stem and centering it within the line of cut of said knife, means for moving said clamping members and said knife relatively to each other to bring the pimiento into contact with said knife to cut the core free from the sides of the pimiento, and means for simultaneously rotating said knife while moving said members and said knife together.

10. A pimiento coring machine comprising a frame, a conveyor mounted for continuous travel therein, a plurality of coring heads carried by said conveyor each head having a coring knife and means for supporting a pimiento thereover comprising a pair of pivoted clamping members, and means carried by said frame for moving said knife and said supporting means of each head relatively to each other in succession as the conveyor carries the heads through the machine to remove the cores from the pimiento.

11. A pimiento coring machine comprising a frame, a conveyor mounted for continuous travel therein, a plurality of coring heads carried by said conveyor each head having a coring knife and means for supporting a pimiento thereover comprising a pair of pivoted clamping members, means carried by said frame for moving said knife and said supporting means of each head relatively to each other in succession as the conveyor carries the heads through the machine, and means for simultaneously rotating said knife of each head during the period of said movement.

12. A pimiento coring machine comprising a frame, a conveyor mounted for continuous movement therein, a plurality of coring heads carried by said conveyor each head comprising a coring knife, a pair of pivoted clamping members for gripping and supporting a pimiento, in cutting relation to said knife, said members also being bodily movable with respect to said knife, and cam tracks secured to said frame for controlling the movements of said members to cause the knife to remove the cores from the pimiento as said conveyor traverses the machine.

13. A pimiento coring machine comprising a frame, a conveyor mounted for continuous movement therein, a plurality of coring heads carried by said conveyor each head comprising a coring knife, clamping members for gripping and supporting a pimiento in cutting relation to said knife including a pair of clamping members for gripping the exterior of the pimiento and a pair of gripper members for gripping the stem of the pimiento, said members also being bodily movable with respect to said knife, and cam tracks secured to said frame for controlling the movements of said members to cause the knife to remove the cores from the pimiento as said conveyor traverses the machine.

14. A pimiento coring machine comprising a frame, a conveyor mounted for continuous movement therein, a plurality of coring heads carried by said conveyor each head comprising a coring knife, clamping members for supporting a pimiento over said knife, including a pair of clamping members for gripping the exterior of the pimiento and a pair of gripper members for gripping the stem of the pimiento, said members also being bodily movable with respect to said knife, cam tracks secured to said frame for controlling the movements of said members to cause the knife to remove the cores from the pimiento as said conveyor traverses the machine, and means for imparting rotary movement to said stem grippers.

15. A pimiento coring machine comprising a frame, a conveyor mounted for continuous movement therein, a plurality of coring heads carried by said conveyor each head comprising a coring knife, clamping members for supporting a pimiento over said knife, including a pair of clamping members for gripping the exterior of the pimiento and a pair of gripper members for gripping the stem of the pimiento, said members also being bodily movable with respect to said knife, cam tracks secured to said frame for controlling the movements of said members to cause the knife to remove the cores from the pimiento as said conveyor traverses the machine, and means for imparting rotary movement to said stem grippers, said tracks serving to thereafter permit said stem grippers to open to vibrate the open grippers.

16. A pimiento coring machine comprising a frame, a conveyor mounted for continuous movement therein, a plurality of coring heads carried by said conveyor each head comprising a coring knife and a set of grippers for engaging the exterior of the pimiento and supporting it over said knife and a set of grippers for holding the stem of the pimiento, said grippers being normally biased to one position; cam tracks carried by said frame for moving said grippers against the biasing means and moving the grippers relatively to the knife for cutting the core of the pimiento free from the sides thereof.

17. A pimiento coring machine comprising a frame, a conveyor mounted for continuous movement therein, a plurality of coring heads carried by said conveyor each head comprising a coring knife, a friction disc secured thereto, and a set of grippers for engaging the exterior of the pimiento and supporting it over said knife and a set of grippers for holding the stem of the pimiento, said grippers being normally biased to one position; cam tracks carried by said frame for moving said grippers against the biasing means and moving the grippers relatively to the knife to cut the core of the pimiento free from the sides thereof, and driving means carried by said frame for contacting with said disc to rotate said knife simultaneously with the movement of said grippers relatively thereto.

18. In a pimiento coring machine a coring head comprising a head member having a tubular knife rotatably mounted therein, a pair of pivoted clamping members adapted to grip the exterior of a pimiento to support the pimiento over said knife, said grippers and said knife being movable toward each other, means operable to move said grippers and said knife relatively to cut the core free from the sides of the pimiento, and means for rotating the knife only while it is moving into the fruit.

19. In a pimiento coring machine a coring head comprising a head member having a tubular knife rotatably mounted therein, a pair of pivoted clamping members adapted to grip the stem of a pimiento to support the pimiento over said knife, said grippers and said knife being movable toward each other and means operable to bring said grippers and said knife together to cut the core free from the sides of the pimiento.

20. In a fruit coring machine, a support for the fruit to be cored comprising movable members adapted to clamp the fruit, a tubular coring knife, means for actuating said members, automatic means for moving said members and knife relatively to each other to cause the knife to enter the fruit and to be withdrawn therefrom, and means for causing a relative rotational movement of the fruit and knife only while the knife is entering the fruit.

In witness whereof, I hereunto subscribe my signature.

ALBERT K. SMITH.